(12) United States Patent
Suzuki

(10) Patent No.: US 6,552,868 B1
(45) Date of Patent: Apr. 22, 2003

(54) MAGNETIC TAPE LIBRARY APPARATUS HAVING SMALL SIZE AND CAPABLE OF QUICKLY LOADING/UNLOADING TAPE CARTRIDGES

(75) Inventor: Kenichi Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 93 days.

(21) Appl. No.: 09/598,474

(22) Filed: Jun. 22, 2000

(30) Foreign Application Priority Data

Jun. 23, 1999 (JP) ............................................ 11-176354

(51) Int. Cl.[7] ............................................... G11B 15/68
(52) U.S. Cl. ........................................................ 360/92
(58) Field of Search ............................... 360/92, 98.04, 360/98.06, 96.5; 369/30.75

(56) References Cited

U.S. PATENT DOCUMENTS

| | | | |
|---|---|---|---|
| 5,995,320 A | * 11/1999 | Ostwald | 360/92 |
| 6,027,296 A | * 2/2000 | Meier | 414/281 |
| 6,041,026 A | * 3/2000 | Hammar et al. | 369/36 |
| 6,094,322 A | * 7/2000 | Nakagomi et al. | 360/92 |
| 6,104,564 A | * 8/2000 | Shibuya et al. | 360/69 |
| 6,115,207 A | * 9/2000 | D'Alayer De Costemore D'Arc et al. | 360/92 |
| 6,141,178 A | * 10/2000 | Nakajima et al. | 360/92 |
| 6,184,643 B1 | * 2/2001 | Akiyama et al. | 318/566 |
| 6,229,667 B1 | * 5/2001 | Ostwald | 360/92 |
| 6,259,578 B1 | * 7/2001 | Christiansen et al. | 360/92 |

FOREIGN PATENT DOCUMENTS

| | | |
|---|---|---|
| JP | 7-134854 | 5/1995 |
| JP | 8-306116 | 11/1996 |
| JP | 2000-99660 | 4/2000 |

OTHER PUBLICATIONS

Japanese Office Action dated Nov. 6, 2002 with partial English translation.

* cited by examiner

Primary Examiner—Jefferson Evans
(74) Attorney, Agent, or Firm—McGinn & Gibb, PLLC

(57) ABSTRACT

In a magnetic tape library apparatus comprising a cartridge storage shelf for storing a plurality of tape cartridges, a data recording/reproducing unit for recording/reproducing data to/from the tape cartridge, an entry mechanism for inserting/ejecting the tape cartridge into/from the magnetic tape library apparatus, and an access mechanism for transferring the tape cartridge between the cartridge storage shelf and the data recording/reproducing unit, the entry and the access mechanisms are structured into a single body so as to serve as an access unit.

23 Claims, 4 Drawing Sheets

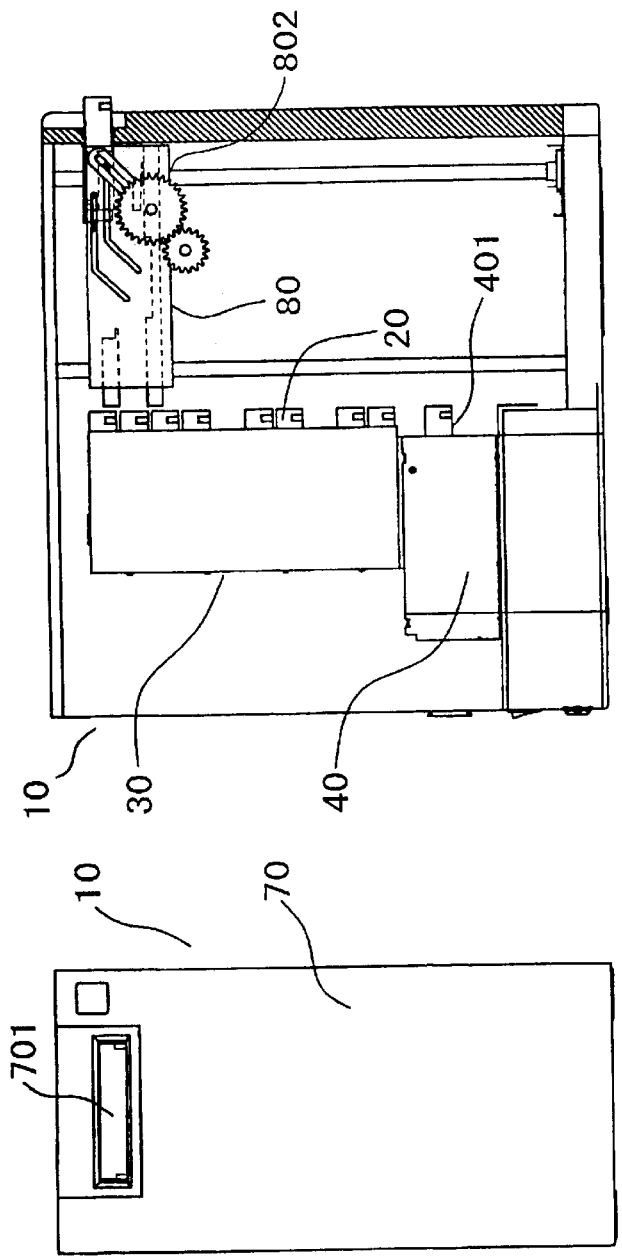
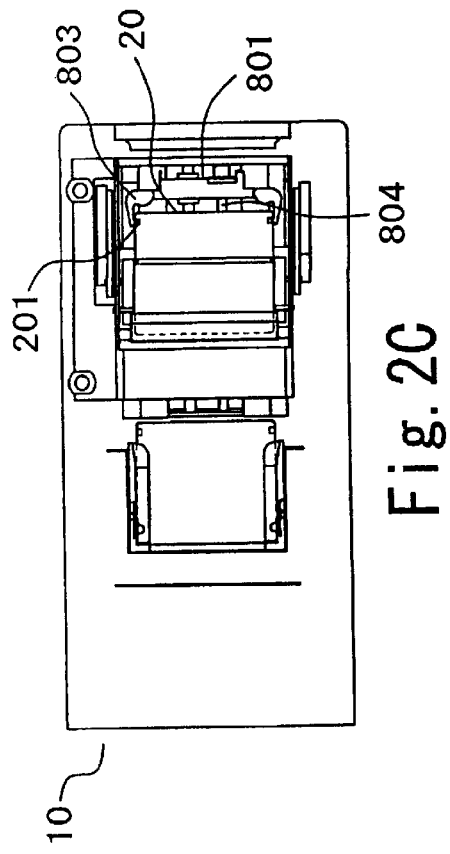

MAGNETIC TAPE LIBRARY APPARATUS HAVING SMALL SIZE AND CAPABLE OF QUICKLY LOADING/UNLOADING TAPE CARTRIDGES

BACKGROUND OF THE INVENTION

The present invention relates to a magnetic tape library apparatus for automatically loading/unloading and storing a plurality of cartridge type magnetic tapes (will be referred to as tape cartridges hereinafter) and recording/reproducing data to/from the tape cartridges.

Conventionally, the tape cartridge has been well known as a medium for recording data. However, the tape cartridge is limited in volume of recording area, so that the tape cartridge is also limited in capacity of recording data. Therefore, a number of tape cartridges are required for a computer system such as a calculating system or a data base frame system to record a large quantity of indispensable data. In addition, a user of the computer system must change, namely, insert/eject many tape cartridges to a recording/reproducing apparatus in order to retrieve data. Needless to say, this puts the user to a great deal of inconvenience.

Therefore, the magnetic tape library apparatus for automatically loading/unloading and storing a plurality of tape cartridges and recording/reproducing data to/from the tape cartridges has been proposed and used.

Generally, the magnetic tape library apparatus comprises a cartridge storage shelf for storing a plurality of tape cartridges, a data recording/reproducing unit for recording/reproducing data to/from the tape cartridge, an entry mechanism for inserting/ejecting the tape cartridge into/from the magnetic tape library apparatus, and an access mechanism for transferring the tape cartridge between the cartridge storage shelf and the data recording/reproducing unit in the magnetic tape library apparatus. Furthermore, the magnetic tape library apparatus has a case for containing the cartridge storage shelf, the data recording/reproducing unit, the entry mechanism, the access mechanism, and so on. The case has (or is defined by) width, height, and depth directions which orthogonally cross at right angle to one another.

The cartridge storage shelf stores the tape cartridges so that the tape cartridges are arranged in the height direction in the case. The data recording/reproducing unit is arranged so as to adjoin the cartridge storage shelf in the height direction. The access mechanism transfers the tape cartridge in the height direction so that the tape cartridge is transferred between the cartridge storage shelf and the data recording/reproducing unit. The entry mechanism inserts/ejects the tape cartridge through access mechanism into/from the magnetic tape library apparatus. The entry mechanism transfers the tape cartridge in the depth direction.

Conventionally, the access and the entry mechanisms are independently comprised, as two units apart from each other, in the magnetic tape library apparatus.

The entry unit apart from the access unit is provided with an entry rack for temporarily holding the tape cartridge and a horizontal transferring mechanism portion for transferring the entry rack holding the tape cartridge in the depth direction so that the tape cartridge is transferred between the user and the access unit.

However, the conventional magnetic tape library apparatus needs a relatively wide space for arranging the entry rack and the horizontal transferring mechanism portion of the entry unit in the case. Therefore, the conventional magnetic tape library apparatus is enlarged in size. Furthermore, because the tape cartridge must be temporarily stored in the entry rack when the tape cartridge is inserted/ejected into/from the apparatus, the conventional magnetic tape library apparatus needs a relative long time duration for loading/unloading the tape cartridge.

SUMMARY OF THE INVENTION

It is therefore an object of the present invention to provide a magnetic tape library apparatus which has a small size.

It is another object of the present invention to provide a magnetic tape library apparatus which can load/unload the tape cartridge in high speed.

The other objects, features, and advantages of the present invention will become clear as the following description proceeds.

The present invention is directed to a magnetic tape library apparatus comprising a cartridge storage shelf for storing a plurality of tape cartridges, a data recording/reproducing unit for recording/reproducing data to/from the tape cartridge, an entry mechanism for inserting/ejecting the tape cartridge into/from the magnetic tape library apparatus, and an access mechanism for transferring the tape cartridge between the cartridge storage shelf and the data recording/reproducing unit. The entry and the access mechanisms are structured into a single body so as to serve as only an access unit.

BRIEF DESCRIPTION OF THE DRAWINGS

FIGS. 2A, 2B, and 2C are front, cross sectional, and the other cross sectional views schematically showing the magnetic tape library apparatus according to an embodiment of the present invention;

DESCRIPTION OF THE PREFERRED EMBODIMENTS

In order to facilitate an understanding of the present invention, description will at first be made with reference to the drawings about a conventional magnetic tape library.

Figure 1B:
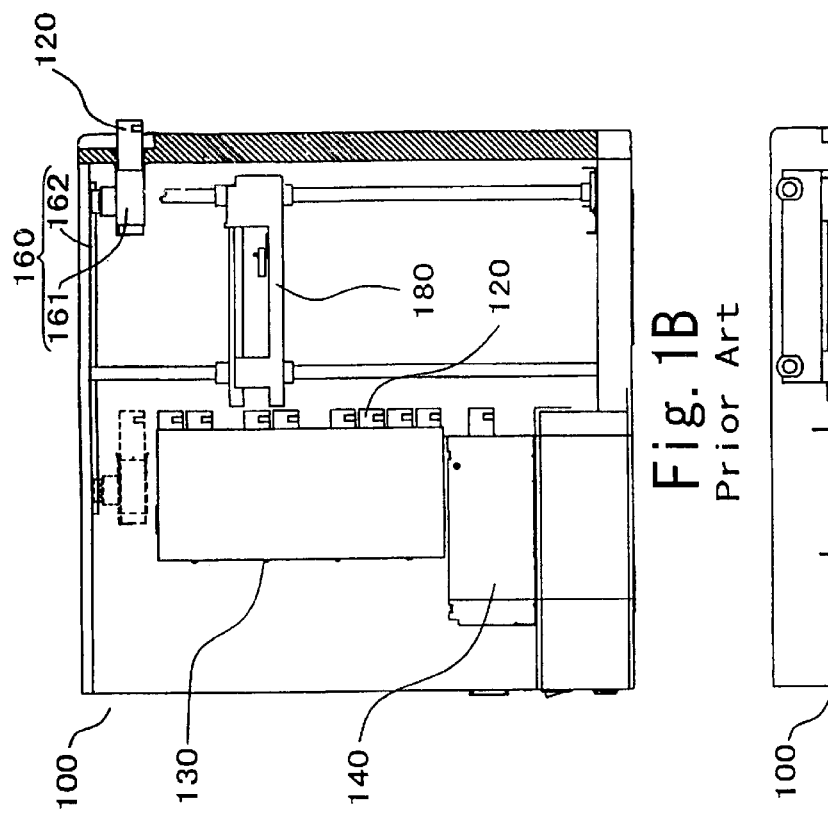
Figs. 1A, 1B, and 1C are front, cross sectional, and the other cross sectional views schematically showing a conventional magnetic tape library apparatus.
Figure 1C:
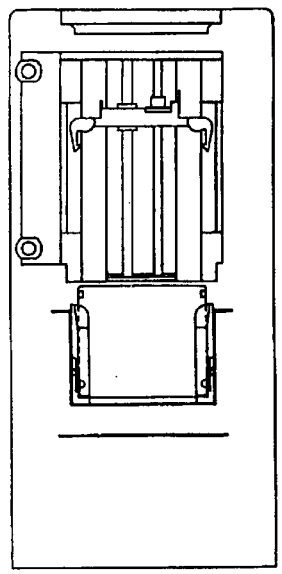
Figure 1A:
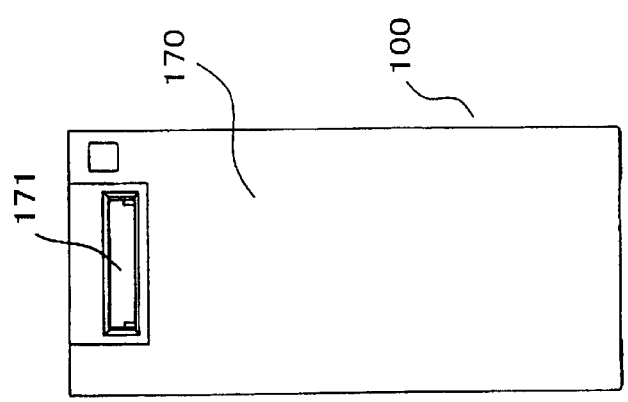

Referring to FIGS. 1A to 1C, a conventional magnetic tape library apparatus 100 automatically loads/unloads and stores a plurality of tape cartridges and records/reproduces data to/from the tape cartridges 120.

The magnetic tape library apparatus 100 comprises a cartridge storage shelf 130 for storing the tape cartridges 120, a data recording/reproducing unit 140 for recording/reproducing data to/from the tape cartridge 120, an entry unit 160 for inserting/ejecting the tape cartridge 120 into/from the magnetic tape library apparatus 100, and an access unit 180 for transferring the tape cartridge 120 between the cartridge storage shelf 130 and the data recording/reproducing unit 140 in the magnetic tape library apparatus 100.

Furthermore, the magnetic tape library apparatus 100 has a case for containing the cartridge storage shelf 130, the data recording/reproducing unit 140, the entry unit 160, the access unit 180, and so on. The case is defined by width, height, and depth directions (left and right directions in FIG. 1A, upward and downward directions in FIG. 1B, and left and right directions in FIG. 1B) which orthogonally cross at right angle to one another and is provided with a front panel 170 at a front end in the depth direction. On the front panel 170, a cartridge insertion/ejection slot 171 is formed. The cartridge insertion/ejection slot 171 is used for inserting/ejecting the tape cartridge 120 into/from the magnetic tape library apparatus 100.

The cartridge storage shelf 130 stores the tape cartridges 120 so that the tape cartridges 120 are arranged in the height direction of the case. The data recording/reproducing unit 140 is arranged so as to adjoin the cartridge storage shelf 130 in the height direction. The access unit 180 transfers the tape cartridge 120 in the height direction so that the tape cartridge 120 is transferred between the cartridge storage shelf 130 and the data recording/reproducing unit 140. The entry unit 160 inserts/ejects the tape cartridge 120 through access unit 180 into/from the magnetic tape library apparatus 100. Concretely, the entry unit 160 transfers the tape cartridge 120 in the depth direction.

The access and the entry units 180 and 160, respectively, are independently comprised, as two units apart from each other, in the magnetic tape library apparatus 100. The entry unit 160 apart from the access unit 180 is provided with an entry rack 161 for temporarily holding the tape cartridge 120 and a horizontal transferring mechanism portion 162 for transferring the entry rack 161 holding the tape cartridge 120 in the depth direction so that the tape cartridge 120 is transferred between the user of the apparatus and the access unit 180 through the cartridge insertion/ejection slot 171.

The conventional magnetic tape library apparatus 100 has disadvantages, as described in the preamble of the instant specification.

Figure 3A:
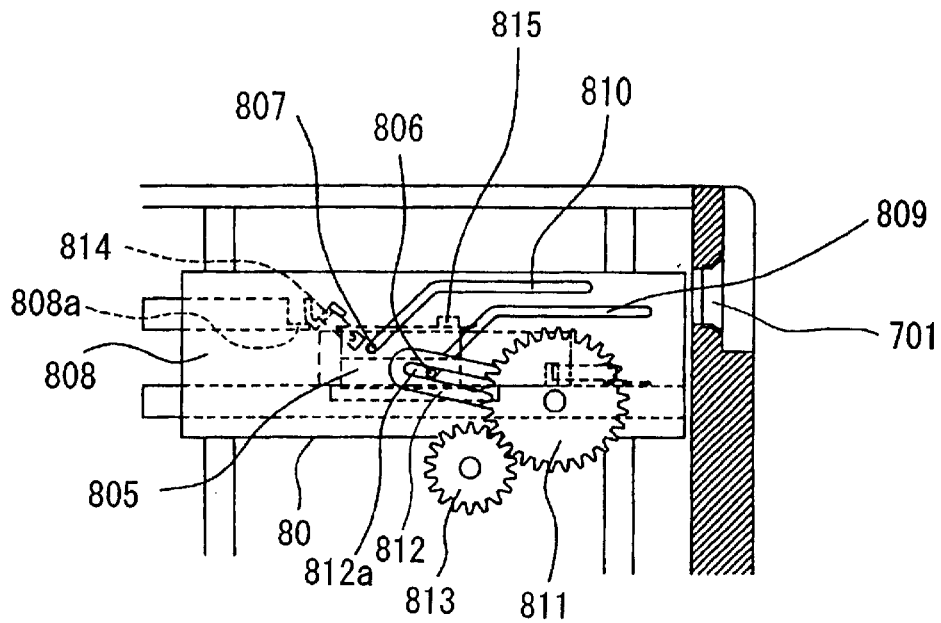
FIGS. 3A and 3B are cross sectional and the other cross sectional views of an access unit of the magnetic tape library apparatus shown in FIGS. 2A to 2C.
Figure 3B:
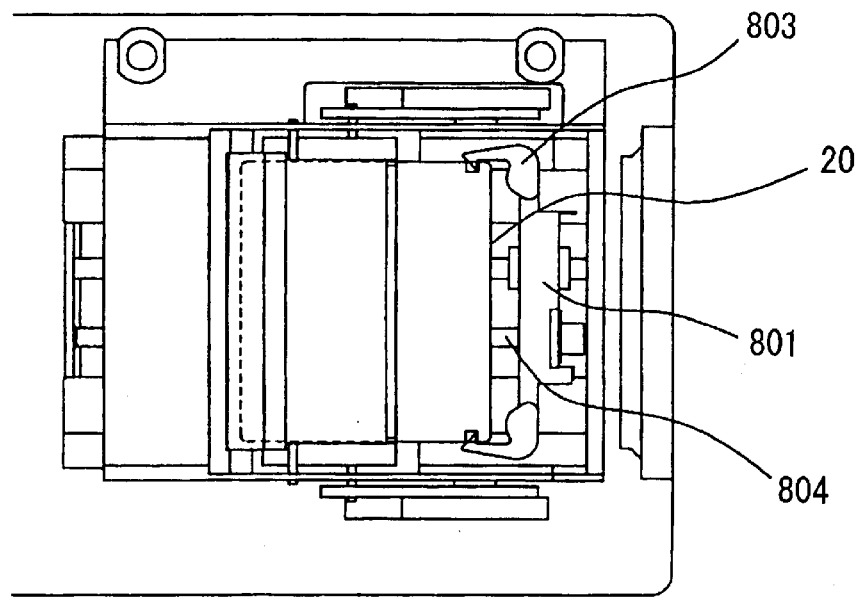

Now, preferred embodiment of the present invention will be described with reference to FIGS. 2 to 4.

Referring to FIGS. 2A to 2C, a magnetic tape library apparatus 10 according to an embodiment of the present invention automatically loads/unloads and stores a plurality of tape cartridges and records/reproduces data to/from the tape cartridges 20 as like as the conventional magnetic tape library apparatus 100 illustrated in FIGS. 1A to 1C.

As like as the magnetic tape library apparatus 100, the magnetic tape library apparatus 10 comprises a cartridge storage shelf 30, a data recording/reproducing unit 40, an entry mechanism for inserting/ejecting the tape cartridge 20 into/from the magnetic tape library apparatus 10, and an access mechanism for transferring the tape cartridge 20 between the cartridge storage shelf 30 and the data recording/reproducing unit 40 in the magnetic tape library apparatus 10.

Furthermore, the magnetic tape library apparatus 10 has a case for containing the cartridge storage shelf 30, the data recording/reproducing unit 40, the entry and the access mechanisms, and so on. The case is defined by width, height, and depth directions corresponding to first, second, and third directions which orthogonally cross at right angle to one another. The width, the height, and the depth directions correspond to left and right directions in FIG. 2A, upward and downward directions in FIG. 2B, and left and right directions in FIG. 2B. The case is provided with a front panel 70 at a front end in the depth direction. On the front panel 70, a cartridge insertion/ejection slot 701 is formed. The cartridge insertion/ejection slot 701 is used for inserting/ejecting the tape cartridge 20 into/from the magnetic tape library apparatus 10.

The cartridge storage shelf 30 stores the tape cartridges 20 so that the tape cartridges 20 are arranged in the height direction in the case, The data recording/reproducing unit 40 is arranged so as to adjoin the cartridge storage shelf 30 in the height direction.

Particularly, the access and the entry mechanisms are structured into a single body so as to serve as only an access unit 80 in the magnetic tape library apparatus 10 according to the present invention.

The access unit 80 comprises a chuck mechanism portion 801 and a vertical transfer mechanism portion 802. The chuck mechanism portion 801 is used for releasably chucking or pinching the tape cartridge 20 and loading/unloading the tape cartridge 20 into/from each of the cartridge storage shelf 30 and a cartridge loading/unloading position 401 located at front of the data recording/reproducing unit 40. The vertical transfer mechanism portion 802 is used for transferring the chuck mechanism portion 801 chucking the tape cartridge 20 between or among the cartridge insertion/ejection slot 701, the cartridge storage shelf 30, and the data recording/reproducing unit 40.

Referring to FIGS. 2A to 2C and 3A and 3B, the chuck mechanism portion 801 of the access unit 80 is provided with a hand portion 803 for releasably chucking the tape cartridge 20, a hand drive portion 804 for loading/unloading the tape cartridge 20 into/from each of the cartridge storage shelf 30 and the data recording/reproducing unit 40, and a lifter 805 which will be described below.

One of the tape cartridges 20 contained in the cartridge storage shelf 30 is voluntarily selected and is loaded data recording/reproducing unit 40 as follows. The chuck mechanism portion 801 is transferred to a front of one of the tape cartridges 20 to be selected in the cartridge storage shelf 30 in the height direction by the vertical transfer mechanism portion 802 of the access unit 80. The hand portion 803 of the chuck mechanism portion 801 chucks the tape cartridge 20 at dents 201 formed on the tape cartridge 20. The hand drive portion 804 pulls up (unloads) the hand portion 803 chucking the tape cartridge 20 from the cartridge storage shelf 30. Then, the tape cartridge 20 is temporarily stored in the chuck mechanism portion 801. The vertical transfer mechanism portion 802 of the access unit 80 transfers the chuck mechanism portion containing the tape cartridge 20 therein to the front of the cartridge loading/unloading position 401 of the data recording/reproducing unit 40. The hand drive portion 804 pushes (loads) the hand portion 803 chucking the tape cartridge 20 in the chuck mechanism portion 80 toward the data recording/reproducing unit 40. The hand portion 803 releases the tape cartridge 20. Thus, the tape cartridge 20 is loaded into the data recording/reproducing unit 40.

The chuck mechanism portion 801 has a base frame 808 which is provided with side walls extending in the height and the depth directions at both sides in the width direction. The lifter 805 is supported by two shafts 806 and 807. The shafts 806 and 807 are located so as to be arranged to each other in the depth direction and extended in the width direction. The shafts 806 and 807 are inserted into guide slits 809 and 810, respectively. The guide slits 809 and 810 are formed the side walls of the base frame 808. The guide slits 809 and 810 have an incline area slantingly extending in the height and the depth directions and a straight area straightly extending in the depth direction, respectively. Both side ends of the shaft 806 are further inserted into slits 812*a*. Each of the slits 812a is formed on a lever 812. The lever 812 is extended form an axle of a lifter gear 811 in a diameter direction. The lifter gear 811 is arranged above or over each of the side walls of the base frame 808. When the lifter gear 811 is rotated, the shaft 806 is forced (pushed) by the lever 812 rotated with the lifter gear 811. Consequently, the lifter 805 is upwardly and frontwardly slid along the slits 809 and 810. Thus, the lifter 805 is located upwardly and frontwardly. The lifter gear 811 is driven by a gear 813 fixed on a shaft of a drive motor (not shown).

The lifter 805 is further provided with a cartridge stopper 814 for limiting the tape cartridge 20 to be inserted in excess. Namely, the cartridge stopper 814 holds the tape cartridge 20 so as to limit the tape cartridge 20 to be inserted in excess toward inside of the magnetic tape library apparatus 10 when the tape cartridge 20 is inserted through the cartridge insertion/ejection slot 701. The cartridge stopper 814 is upwardly and downwardly rotatable so as to be opened and closed. For this purpose, the base frame 808 comprises a plate portion 808a for shoving the cartridge stopper 814 when it contacts with the cartridge stopper 814. Concretely, the cartridge stopper 814 is closed when the lifter 805 is located on a rear of the cartridge insertion/ejection slot 701 and the lifter is being transferred. Contrastively, the cartridge stopper 814 is upwardly opened when the lifter 805 has been contained in the middle of the base frame 808 so that the cartridge stopper 814 is shaven by the plate portion 808a of the base frame 808. Consequently, the hand portion 803 driven by the hand drive portion 804 can load/unload the tape cartridge 20 into/from the lifter 805 when the lifter 805 is contained in the middle of the base frame 808.

Furthermore, the lifter 805 is provided with a sensor 815 for opt-electrically or mecha-electrically sensing the tape cartridge 20 to be inserted therein.

Description will be made with reference to FIGS. 4A to 4D about operation of the magnetic tape library apparatus 10 when the tape cartridge 20 is inserted into the magnetic tape library apparatus 10.

Figure 4C:
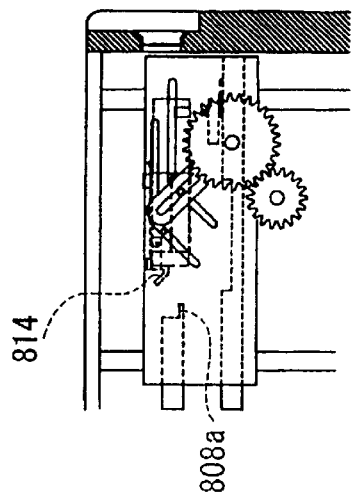
FIGS. 4A, 4B, 4c and 4D are cross sectional views for illustrating movement of the access unit shown in FIGS. 3A and 3B.
Figure 4D:
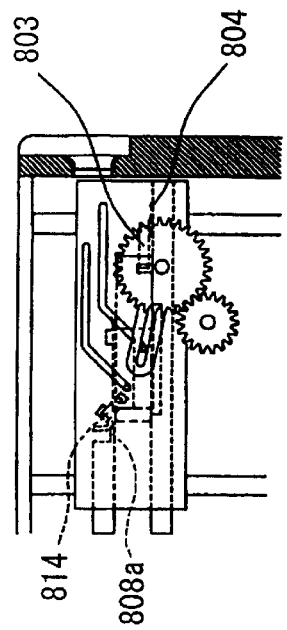
Figure 4A:
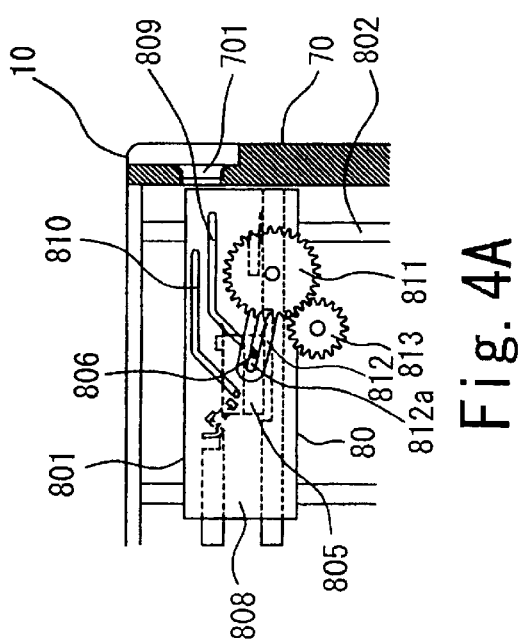

In FIG. 4A, the tape cartridge 20 has not been inserted into the magnetic tape library apparatus 10. The lifter 805 is retracted in the middle of the base frame 808. First, the vertical transfer mechanism portion 802 of the access unit 80 transfers the chuck mechanism portion 801 so that the lifter 805 is positioned at the rear of the cartridge insertion/ejection slot 701. Next, the drive motor fixing the gear 813 on the axis thereof starts to rotate. The lifter gear 811 is rotated (clockwise in FIG. 4A) through the gear 813 by the drive motor. When the lifter gear 811 is rotated, the lever 812 is also rotated so as to be tilted. The shaft 806 is forced (clockwise in FIG. 4A) through the slit 812a by the lever 812. The lifter 805 is upwardly and frontwardly transferred along the inclined areas of the guide slits 809 and 810 formed on the base frame 808. Thereafter, the lifter 805 is further frontwardly transferred along the straight areas of the guide slits 809 and 810. Thus, the lifter 805 has been positioned at the rear of the cartridge insertion/ejection slot 701. Consequently, the magnetic tape library apparatus 10 can load the tape cartridge 20 therein.

Figure 4B:
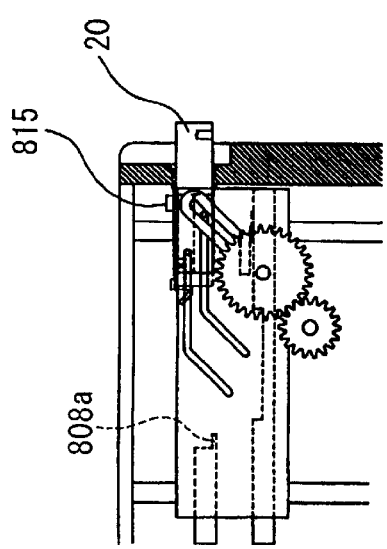

In FIG. 4B, the tape cartridge 20 is inserted into the magnetic tape library apparatus 10 thorough the cartridge insertion/ejection slot 701 by the user. The excess insertion of the tape cartridge 20 is stopped by the cartridge stopper 814. After the sensor senses that the tape cartridge 20 is inserted into the magnetic tape library apparatus 10 thorough the cartridge insertion/ejection slot 701, the drive motor drives the lifter gear 811 in reverse direction to the last time mentioned above (counterclockwise in FIG. 4B) through the gear 813. When the lifter gear 811 is rotated, the lever 812 is also rotated so as to be tilted. The shaft 806 is forced (counterclockwise in FIG. 4B) through the slit 812a by the lever 812. The lifter 805 starts to be backwardly transferred along the straight areas of the guide slits 809 and 810 formed on the base frame 808. Thereafter, the lifter 805 will be downwardly and further backwardly transferred along the inclined areas of the guide slits 809 and 810.

In FIG. 4C, the lifter 805 containing the tape cartridge 20 therein is being downwardly and further backwardly transferred along the inclined areas of the guide slits 809 and 810. When the lifter 805 reaches the middle of the base frame 808, the drive motor stops to drive the lifter gear 811 so as to stop the lifter 805 from downwardly and further backwardly transferring. The cartridge stopper 814 is upwardly forced by the plate portion 808a of the base frame 808 and is opened. Thus, the cartridge stopper 814 releases the tape cartridge 20 from stopping.

In FIG. 4D, the lifter 805 has is contained in the middle of the base frame 808. The hand portion 803 driven by the hand drive portion 804 of the chuck mechanism portion 801 can chuck the tape cartridge 20. Namely, the hand portion 803 can push the tape cartridge 20 from the lifter 805 and can load into the cartridge storage shelf 30. Consequently, the tape cartridge 20 will be able to be loaded into the data recording/reproducing unit 40 from the cartridge storage shelf 30 by the vertical transfer mechanism portion 802.

Thus, the tape cartridge 20 is inserted into the magnetic tape library apparatus 10 so as to be stored in the cartridge storage shelf 30. Then, the unit data recording/reproducing unit 40 can record/reproduce data to/from the tape cartridge 20.

On the other hand, the tape cartridge 20 stored in the cartridge storage shelf 30 is ejected from the magnetic tape library apparatus 10 in the reverse order to the above-mentioned steps for inserting the tape cartridge 20 into the magnetic tape library apparatus 10.

While the present invention has thus far been described in conjunction with an embodiment thereof, it will readily be possible for those skilled in the art to put the present invention into practice in various other manners. For example, the present invention will be applied to a variety of library apparatuses used for a variety of media such as optical disk instead of the tape cartridge.

What is claimed is:

1. A magnetic tape library apparatus comprising:
    a cartridge storage shelf for storing a tape cartridge;
    a data recording/reproducing unit for recording/reproducing data to/from said tape cartridge;
    an entry mechanism for inserting/ejecting said tape cartridge into/from said magnetic tape library apparatus; and
    an access mechanism for transferring said tape cartridge between said cartridge storage shelf and said data recording/reproducing unit,
    wherein said entry mechanism and said access mechanism are structured into a single body so as to serve as an access unit for said tape cartridge, and
    wherein said tape cartridge is movable within said access unit in a first axial direction on a first plane and in a second axial direction oil a second plane perpendicular to said first plane.

2. The magnetic tape library apparatus as claimed in claim 1, wherein said magnetic tape library apparatus further comprises:

a case which is provided with a cartridge insertion/ejection slot for inserting/ejecting said tape cartridge into/from the magnetic tape library apparatus, wherein said access unit comprises:

a chuck mechanism portion for releasably chucking said tape cartridge and loading/unloading said tape cartridge into/from each of said cartridge storage shelf and said data recording/reproducing unit; and a vertical transfer mechanism portion for transferring said chuck mechanism portion chucking said tape cartridge between said cartridge insertion/ejection slot, said cartridge storage shelf, and said data recording/reproducing unit.

3. The magnetic tape library apparatus as claimed in claim 1, wherein said access unit comprises a chuck mechanism portion for releasably chucking said tape cartridge and loading/unloading said tape cartridge into/from each of said cartridge storage shelf and said data recording/reproducing unit.

4. The magnetic tape library apparatus as claimed in claim 3, wherein said chuck mechanism portion includes a hand portion for releasably chucking said tape cartridge.

5. The magnetic tape library apparatus as claimed in claim 4, wherein said hand portion chucks said tape cartridge at dents formed on said tape cartridge.

6. The magnetic tape library apparatus as claimed in claim 4, wherein said chuck mechanism portion includes a lifter for transferring said tape cartridge between a cartridge insertion/ejection slot and a position where said hand portion can chuck said tape cartridge.

7. The magnetic tape library apparatus as claimed in claim 3, wherein said chuck mechanism portion includes a hand drive portion for loading/unloading said tape cartridge into/from each of said cartridge storage shelf and said data recording/reproducing unit.

8. The magnetic tape library apparatus as claimed in claim 3, wherein said access unit comprises a transfer mechanism portion for transferring said chuck mechanism portion for chucking said tape cartridge between a cartridge insertion/ejection slot, said cartridge storage shelf, and said data recording/reproducing unit.

9. A magnetic tape library apparatus comprising:

a cartridge storage shelf for storing a tape cartridge;

a data recording/reproducing unit for recording/reproducing data to/from said tape cartridge;

an entry mechanism for inserting/ejecting said tape cartridge into/from said magnetic tape library apparatus;

an access mechanism for transferring said tape cartridge between said cartridge storage shell and said data recording/reproducing unit; and a case which is provided with a cartridge insertion/ejection slot for inserting/ejecting said tape cartridge into/from the magnetic tape library apparatus;

wherein said entry mechanism and said access mechanism are structured into a single body so as to serve as an access unit for said tape cartridge, wherein said access unit comprises:

a chuck mechanism portion for releasably chucking said tape cartridge and loading/unloading said tape cartridge into/from each of said cartridge storage shelf and said data recording/reproducing unit; and a vertical transfer mechanism portion for transferring said chuck mechanism portion chucking said tape cartridge between said cartridge insertion/ejection slot, said cartridge storage shelf, and said data recording/reproducing unit, and wherein said chuck mechanism portion includes a hand portion for releasably chucking said tape cartridge, a hand drive portion for loading/unloading said tape cartridge into/from each of said cartridge storage shelf and said data recording/reproducing unit, and a lifter for transferring said tape cartridge between said cartridge insertion/ejection slot and a position where said hand portion can chuck said tape cartridge.

10. The magnetic tape library apparatus as claimed in claim 9, wherein said magnetic tape library apparatus comprises first, second, and third directions which orthogonally cross at right angles to one another, wherein said cartridge storage shelf stores said tape cartridge so that said tape cartridge is arranged in said second direction, wherein said data recording/reproducing unit is arranged so as to adjoin said cartridge storage shelf in said second direction, wherein said vertical transfer mechanism portion of said access unit transfers said hand portion chucking said tape cartridge between said cartridge insertion/ejection slot, said cartridge storage shelf, and said data recording/reproducing unit in said second direction, wherein said hand drive portion loads/unloads said tape cartridge into/from each of said cartridge storage shelf and said data recording/reproducing unit in said third direction, and wherein said lifter transfers said tape cartridge between said cartridge insertion/ejection slot and said position in said second and/or said third direction.

11. The magnetic tape library apparatus as claimed in claim 10, wherein said chuck mechanism portion comprises a base frame which is provided with side walls extending in said second and third directions at both sides in said first direction, wherein each of said side walls of said base frame includes a guide slit having an inclined area which is extended in said second and said third directions and a straight area which is extended in said third direction, wherein said lifter includes shafts protruding into said first direction said shafts being inserted in said slits, and wherein said lifter is movable in said second and said third directions along said slits.

12. The magnetic tape library apparatus as claimed in claim 11, wherein at least one of said shafts is engaged with a drive source so that said lifter is moved in said second and said third directions.

13. A magnetic tape library apparatus as claimed in claim 12, wherein said lifter is provided with a cartridge stopper for limiting an insertion of said tape cartridge.

14. A magnetic tape library apparatus as claimed in claim 12, wherein said lifter includes with a sensor for sensing said tape cartridge to be inserted therein.

15. A magnetic tape library apparatus comprising:

means for storing a tape cartridge;

means for recording/reproducing data to/from said tape cartridge;

means for inserting/ejecting said tape cartridge into/from said magnetic tape library apparatus; and means for transferring said tape cartridge between said storing means and said recording/reproducing means, wherein an arrangement of said inserting/ejecting means and an arrangement of said transferring means comprises a common unit, and wherein said tape cartridge is movable within said common unit in a first axial direction on a first plane and in a second axial direction on a second plane perpendicular to said first plane.

16. The magnetic tape library apparatus as claimed in claim 15, wherein said inserting/ejecting means comprises a chuck mechanism portion for releasably chucking said tape cartridge and loading/unloading said tape cartridge into/from each of said storing means and said recording/reproducing means.

17. The magnetic tape library apparatus as claimed in claim 16, wherein said chuck mechanism portion includes a hand portion for releasably chucking said tape cartridge.

18. The magnetic tape library apparatus as claimed in claim 16, wherein said chuck mechanism portion includes a hand drive portion for loading/unloading said tape cartridge into/from each of said storing means and said recording/reproducing means.

19. A magnetic tape library apparatus comprising:

means for storing a tape cartridge;

means for recording/reproducing data to/from said tape cartridge;

means for inserting/ejecting said tape cartridge into/from said magnetic tape library apparatus; and means for transferring said tape cartridge between said storing means and said recording/reproducing means, wherein an arrangement of said inserting/ejecting means and an arrangement of said transferring means comprises a common unit, wherein said inserting/ejecting means comprises a chuck mechanism portion for releasably chucking said tape cartridge and loading/unloading said tape cartridge into/from each of said storing means and said recording/reproducing means, and wherein said chuck mechanism portion includes a lifter for transferring said tape cartridge between a cartridge insertion/ejection slot and a position where said hand portion can chuck said tape cartridge.

20. A magnetic media library apparatus comprising:

a cartridge storage shelf for storing a media cartridge;

a data recording/reproducing unit for recording/reproducing data to/from said media cartridge;

an entry mechanism for inserting/ejecting said media cartridge into/from said magnetic media library apparatus; and an access mechanism for transferring said media cartridge between said cartridge storage shelf and said data recording/reproducing unit, wherein said entry mechanism and said access mechanism are movable together, and wherein said media cartridge is movable within said access mechanism in a first axial direction on a first plane and in a second axial direction on a second plane perpendicular to said first plane.

21. The magnetic media library apparatus as claimed in claim 20, wherein said entry mechanism and said access mechanism are integrally formed.

22. The magnetic media library apparatus as claimed in claim 20, wherein said entry mechanism and said access mechanism have a unitary construction.

23. The magnetic media library apparatus as claimed in claim 20, wherein said entry mechanism and said access mechanism form an only access unit for insertion of the media cartridge into said magnetic media library apparatus.

* * * * *